(12) United States Patent
Steedly et al.

(10) Patent No.: US 7,778,491 B2
(45) Date of Patent: Aug. 17, 2010

(54) OBLIQUE IMAGE STITCHING

(75) Inventors: Drew Steedly, Redmond, WA (US); Richard Szeliski, Bellevue, WA (US); Matthew Uyttendaele, Seattle, WA (US); Michael Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1157 days.

(21) Appl. No.: 11/279,241

(22) Filed: Apr. 10, 2006

(65) Prior Publication Data

US 2007/0237420 A1    Oct. 11, 2007

(51) Int. Cl.
*G06K 9/32* (2006.01)
*G06K 9/36* (2006.01)
(52) U.S. Cl. ........................ 382/294; 382/285; 382/284
(58) Field of Classification Search ................. 382/294, 382/285
See application file for complete search history.

(56) References Cited

U.S. PATENT DOCUMENTS

| | | | | |
|---|---|---|---|---|
| 5,990,904 | A * | 11/1999 | Griffin | 345/631 |
| 6,009,190 | A * | 12/1999 | Szeliski et al. | 382/154 |
| 6,434,278 | B1 | 8/2002 | Hashimoto | 382/285 |
| 6,522,787 | B1 * | 2/2003 | Kumar et al. | 382/268 |
| 6,750,873 | B1 * | 6/2004 | Bernardini et al. | 345/582 |
| 6,879,323 | B1 * | 4/2005 | Takezawa et al. | 345/420 |
| 6,912,293 | B1 * | 6/2005 | Korobkin | 382/100 |
| 7,002,592 | B2 * | 2/2006 | Horton et al. | 345/582 |
| 7,058,239 | B2 * | 6/2006 | Singh et al. | 382/284 |
| 7,239,805 | B2 * | 7/2007 | Uyttendaele et al. | 396/222 |
| 7,365,744 | B2 * | 4/2008 | Fang et al. | 345/423 |
| 7,499,586 | B2 * | 3/2009 | Agarwala et al. | 382/154 |
| 2001/0038718 | A1 * | 11/2001 | Kumar et al. | 382/284 |
| 2002/0154812 | A1 * | 10/2002 | Chen et al. | 382/154 |
| 2004/0008886 | A1 * | 1/2004 | Boykov | 382/173 |
| 2006/0221072 | A1 * | 10/2006 | Se et al. | 345/420 |
| 2006/0244757 | A1 * | 11/2006 | Fang et al. | 345/582 |
| 2007/0024612 | A1 * | 2/2007 | Balfour | 345/419 |
| 2007/0237421 | A1 * | 10/2007 | Luo et al. | 382/284 |

OTHER PUBLICATIONS

S. Birchfield and C. Tomasi. Multiway cut for stereo and motion with slanted surfaces. In Int'l Conf. on Computer Vision (ICCV), 1999.

(Continued)

*Primary Examiner*—Vikkram Bali
*Assistant Examiner*—Michelle Entezari
(74) *Attorney, Agent, or Firm*—Lyon & Harr, LLP; Mark A. Watson

(57) ABSTRACT

An "Oblique Image Stitcher" provides a technique for constructing a photorealistic oblique view from a set of input images representing a series of partially overlapping views of a scene. The Oblique Image Stitcher first projects each input image onto a geometric proxy of the scene and renders the images from a desired viewpoint. Once the images have been projected onto the geometric proxy, the rendered images are evaluated to identify optimum seams along which the various images are to be blended. Once the optimum seams are selected, the images are remapped relative to those seams by leaving the mapping unchanged at the seams and interpolating a smooth mapping between the seams. The remapped images are then composited to construct the final mosaiced oblique view of the scene. The result is a mosaic image constructed by warping the input images in a photorealistic manner which agrees at seams between images.

20 Claims, 8 Drawing Sheets

OTHER PUBLICATIONS

Y. Boykov and V. Kolmogorov. An experimental comparison of min-cut/max-flow algorithms for energy minimization in vision. IEEE Trans. Pattern Analysis and Machine Intelligence, 26(9):1124-1137, Sep. 2004.

Y. Boykov, O. Veksler, and R. Zabih. Fast approximate energy minimization via graph cuts. In Int'l Conf. on Computer Vision (ICCV), vol. 1, pp. 377-384, Sep. 1999.

V. Kolmogorov and R. Zabih. What energy functions can be minimized via graph cuts? IEEE Trans. Pattern Analysis and Machine Intelligence, 26(2):147-159, Feb. 2004.

D. Scharstein and R. Szeliski. A taxonomy and evaluation of dense two-frame stereo correspondence algorithms. Int'l J. Computer Vision, 47:7-42, Apr. 2002.

W. Zhao, D. Nister, and S. Hsu. Alignment of continous video onto 3d point clouds. In Conf. on Computer Vision and Pattern Recognition (CVPR), pp. 964-971, 2004.

* cited by examiner

Prior Art Stitching of Oblique Images

OBLIQUE IMAGE STITCHING

BACKGROUND

1. Technical Field

The invention is related to image stitching, and in particular, to a technique for constructing a photorealistic mosaiced image from a series of images of a scene.

2. Related Art

A number of conventional techniques have been developed to generate composite or stitched images to create an overall mosaic of a scene. The basic idea in generating such mosaic images is to take a plurality of partially overlapping photographic or video images in order to cover the entirety of the desired viewing space. These images are then aligned, warped, if necessary, and composited into complete panoramic mosaic images.

In general, construction of these mosaic images is accomplished using any of a number of conventional image "mosaicing" or "stitching" algorithms that typically operate by identifying correspondences between the various images.

To identify correspondences between two or more images, conventional image stitching schemes operate to determine which points in one image correspond to the same physical points in another image of the same scene. The images are then warped to correspond the matching points to one another, and the images are merged or blended to construct the mosaic. Solving the correspondence problem to generate mosaic images is relatively simple with respect to top-down or "orthographic" images (such as satellite imagery). In such cases, the resulting mosaic image can be easily constructed without causing objectionable artifacts and warping.

Recently, satellite-based 2D imagery has become increasingly popular for browsing via the Internet. Some such browsing schemes provide mosaiced satellite imagery in combination with overlaid street maps for route planning. Related schemes use topological information to provide a simulated 3D viewing experience by projecting the 2D mosaiced imagery onto a coarse ground elevation model. However, buildings are not modeled by this approach, leading to confusing artifacts (especially with tall buildings) when viewing images from a different direction than the original images were taken from.

For some select cities, extruded polygonal building models are available. Further, detailed 3D models can also be obtained automatically using conventional light detection and ranging (LiDAR)-based techniques. Unfortunately, LiDAR-based techniques tend to be too noisy, and provide insufficient resolution for accurate texture mapping applications. Smoothing LiDAR models tends to be a difficult and computationally expensive problem. In either case, such techniques generally operate to first create an overall mosaic image from the set of input images, and then map the resulting mosaic image to the 3D model. Unfortunately regardless of the type of 3D model that is used, the problem of correctly aligning occlusion boundaries of buildings is not adequately addressed. As a result, the images resulting from such schemes tend to include misaligned textures and mismatching shadows from one surface to another. Further, mapping the mosaiced images to such models typically results in very unnatural angles and warping of objects such as buildings. In other words, the resulting mosaic images do not provide photorealistic views of the scene.

An alternative to the use of full 3D models is to provide oblique views of a scene (such as a set of low-altitude aerial views of the scene) which are then stitched to create an oblique mosaic image for a fixed number of orientations. Then, for a given oblique viewing direction, an orthographic view allows navigation of a large area by panning, much in the same way as with 2D top-down imagery such as stitched satellite imagery.

However, the problem of photorealistic image stitching is more complicated in the case of oblique imagery, especially in the case of images of tall buildings captured at an angle from a moving airplane. In this case, the correspondences between images can be identified to create a relatively seamless mosaic image. Unfortunately, the resulting mosaic image will tend to include a confusing jumble of tall buildings or other structures that all lean at different angles relative to each other because of the different oblique angles at which the various images were captured. In other words, the resulting mosaic images do not provide photorealistic views of the scene.

Some conventional stereo imaging applications attempt to address the problem of different image angles by labeling the pixels of input images to obtain a depth map. This depth information is then used in constructing mosaic images. However, as the depth information in such techniques corresponds to a set of view-parallel planes, slanted surfaces cannot be represented well and appear discretized. Again, the result tends to be a mosaic image that fails to provide a photorealistic view of the scene.

Several conventional mosaicing schemes have attempted to address such problems involves the use of "graph cuts" in combination with conventional stereo imaging applications. With such techniques, the typical goal is to assign a label to each pixel, where each label represents a certain depth. However, rather than assuming view-parallel planes, one such technique uses an approach where each pixel label represents an arbitrary plane, with the affine parameters of each plane being estimated in an expectation-maximization (EM) fashion. The orientations of various surfaces (such as building surfaces) are then estimated and used to warp the various images prior to image stitching. However, the focus of such schemes is on obtaining an accurate depth map of image pixels for use in constructing the resulting mosaic images. Consequently, such schemes tend to fare poorly when addressing the problem of constructing a photorealistic view of the scene.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In contrast to conventional nadir (i.e., top-down, sometimes called "orthographic") aerial or satellite imagery, relatively low altitude oblique imagery provides increased image details, such as the sides of buildings and structures. As a result, such oblique images are frequently considered to be superior to traditional top-down imagery for a number of purposes. Consequently, with respect to mosaic images, the basic problem with the use of such oblique imagery is, given a set of partially overlapping views taken of a scene, looking down at some predetermined angle, to produce an "as-seamless-as-possible" oblique mosaic view of that scene.

An "Oblique Image Stitcher," as described herein, provides a technique for constructing a photorealistic mosaiced view from a set of input images representing a series of oblique views of a scene. Specifically, the Oblique Image Stitcher operates to construct a final mosaiced isometric view of the scene using a rough 3D model of a scene in combination with a series of oblique perspective images of the scene. However, more generally, camera geometry corresponding to the input images and the output mosaic is not constrained to be oblique perspective or isometric projections. In fact, while the Oblique Image Stitcher is generally described herein in the context of construction of an oblique isometric view from the set of perspective input images, the more general case enabled by the Oblique Image Stitcher is that the imaging geometry of the input and output images are both general projective transformations (which also includes pin-hole and parallel projections).

In various embodiments, the rough 3D model is represented using any of a variety of conventional "geometric proxies," such as single planes, digital elevations models (DEMs), digital surface models (DSMs), surfaces reconstructed from stereo images, LiDAR-based 3D models, etc. Further, in various embodiments, refined geometric proxies are constructed from various combinations of the aforementioned 3D models. One such example is to use LiDAR to provide a rough 3D model, and then to use wide baseline stereo imaging techniques on the corresponding aerial imagery to smooth the LiDAR-based model for viewing directions corresponding to the captured images.

In general, the Oblique Image Stitcher first projects each input image onto the geometric proxy of the scene using conventional projective texture mapping techniques and then renders the scene from the desired viewpoint of the mosaic. Further, in one embodiment, the output mosaic viewpoint is an isometric, or oblique parallel, projection. One advantage to rendering from a parallel projection is that it allows for the creation of an arbitrarily large image that can be panned across, as desired. Note that in this case, the viewpoint of the mosaic can be chosen so the imaging rays of the output mosaic are as parallel as possible to the rays from the input perspective images to minimize the artifacts due to incorrect geometric proxies.

In either case, once the images have been mapped to the geometric proxy of the scene, the images are then evaluated to identify optimum seams along which the various images are to be blended. In one embodiment, this evaluation involves the use of a modified graph-cut analysis for identifying the seams.

When composited, those portions of images that project onto parts of the geometric proxy that are accurate will tend to agree from image to image. For example, when using a proxy such as a digital elevation model (DEM), those portions of the image that are either at or near ground level will tend to agree from image to image, even when captured from slightly different viewpoints. Examples of portions of images that will tend to agree when using a DEM include objects/features such as streets, piers, water, or any other low lying and relatively flat features.

Consequently, in one embodiment, the graph-cut analysis for seam identification is biased to prefer features that agree with the geometric proxy of the scene, rather than allowing seams through buildings, trees, or other objects, even in the case where the cost basis of such seams is lower. Consequently, the seams resulting from the biased graph-cut analysis help to provide a more photorealistic mosaic image. Once the optimum seams have been selected, the images are then composited using conventional blending techniques to construct the final mosaiced oblique view of the scene.

In view of the above summary, it is clear that the Oblique Image Stitcher described herein provides a unique system and method for constructing a photorealistic mosaiced image from a series of oblique perspective views of a scene. In addition to the just described benefits, other advantages of the Oblique Image Stitcher will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following description of various embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
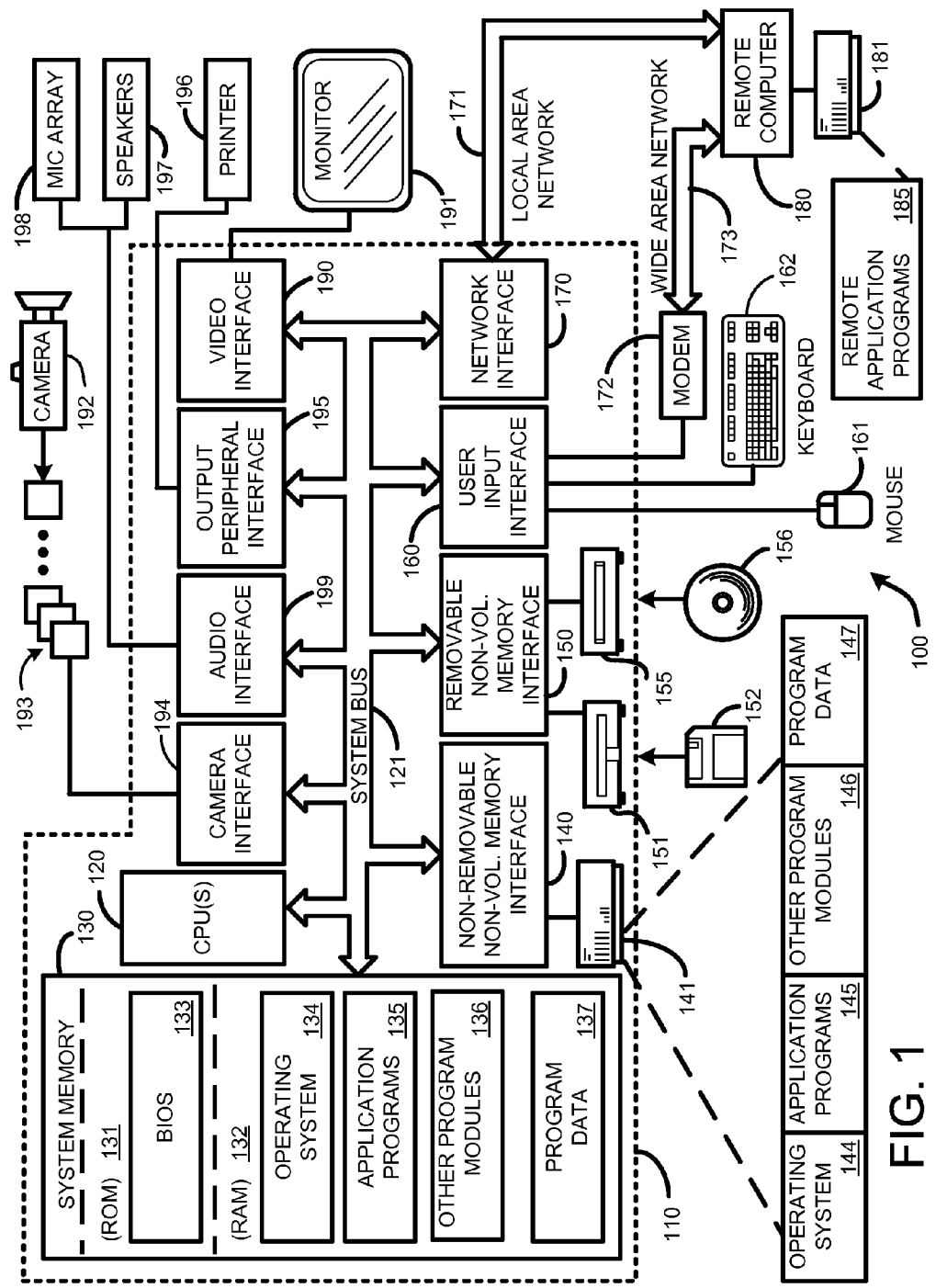
FIG. 1 is a general system diagram depicting a general-purpose computing device constituting an exemplary system for implementing an Oblique Image Stitcher, as described herein.

1.0 Exemplary Operating Environments:

FIG. 1 illustrates an example of a suitable computing environment on which various embodiments and elements of an "Oblique Image Stitcher," as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with various software and/or hardware modules. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CDROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is 0 connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environments having now been discussed, the remaining part of this description will be devoted to a discussion of the program modules and processes embodying the "Oblique Image Stitcher."

Figure 2:
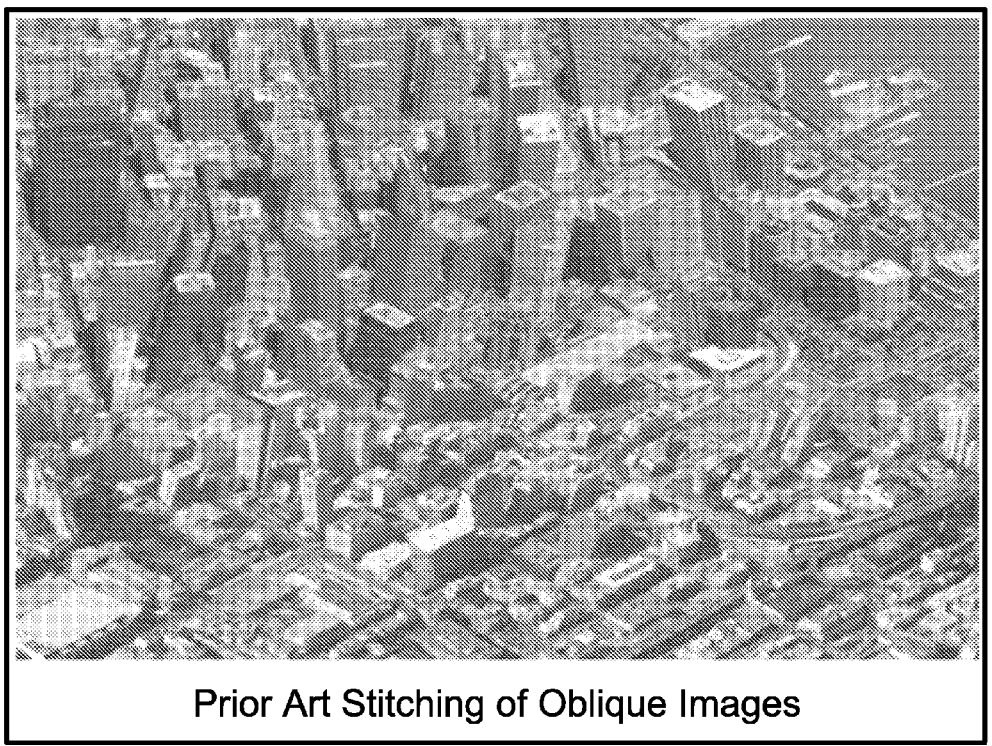
FIG. 2 illustrates an example of stitching oblique imagery of downtown San Francisco using typical prior-art image stitching techniques, thereby producing a non-photorealistic jumble of buildings.

2.0 Introduction:

Conventional methods for stitching oblique imagery generally operate to warp a set of partially overlapping images in order to composite those images into a seamless mosaic image. Unfortunately, the result of such stitching techniques with respect to tall objects captured at oblique angles, such as images of downtown San Francisco captured from a moving aircraft, will tend to look very unrealistic. For example, as illustrated by FIG. 2, while the resulting mosaic image may be seamless (i.e., each of the individual images is seamlessly joined to its neighbors) the overall result of using conventional techniques for stitching oblique images can be an Escher-like jumble of buildings that clearly does not look photorealistic.

An "Oblique Image Stitcher," as described herein operates to construct a photorealistic mosaiced view from a set of input images representing a series of partially overlapping oblique views of a scene. In other words, the Oblique Image Stitcher provides a technique for creating a perceptually plausible mosaic from a series of input images when the camera's center of projection moves from image to image, and the scene is not planar.

In general, the Oblique Image Stitcher begins operation by first projecting each input image onto a geometric proxy of the scene. The projected images are then rendered from a desired viewpoint.

However, unless the geometric proxy models the true geometry of the scene very accurately, a smoothed proxy often generates less noticeable distortions of the input image in the final mosaic. Simply having a smooth proxy does not guarantee that the mapping from input image to output image will also be smooth.

Figure 3A:
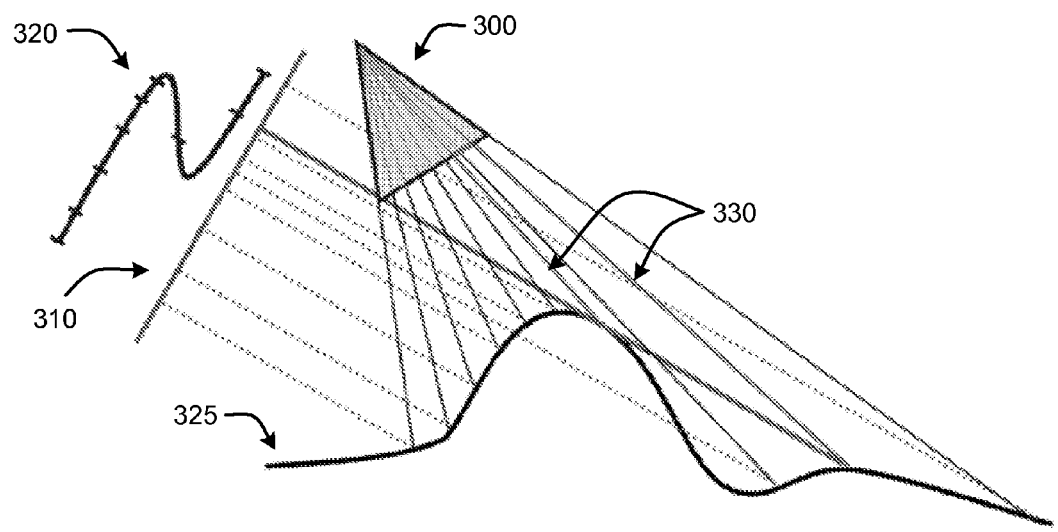
FIG. 3A illustrates an example of a "fold" type discontinuity caused by mapping an input image to an output image relative to a geometric proxy of the scene.
Figure 3B:
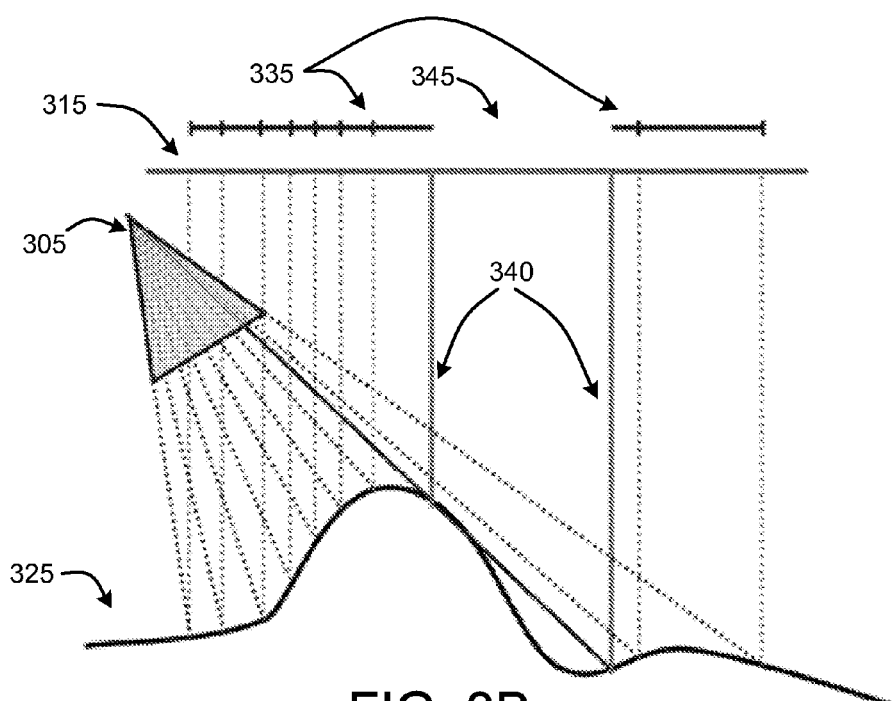
FIG. 3B illustrates an example of a "tear" type discontinuity caused by mapping an input image to an output image relative to a geometric proxy of the scene.

For example, as illustrated by FIGS. 3A and 3B, discontinuities in the mapping from input to output image that can occur even with smooth proxies. In general, FIGS. 3A and 3B illustrates fold and tear type discontinuities, respectively.

In particular, as illustrated by FIGS. 3A and 3B, when images are projected onto non-planar geometry, the mapping from an input image to a desired viewpoint relative to the geometric proxy is not a simple homography, and the resulting mosaic can have distortions or even discontinuities. For example, as shown in FIGS. 3A and 3B, various discontinuities in the mapping of rays from an input camera 300 and 305 to different oblique imaging planes 310 and 315 are possible given non-planar geometric proxies.

Specifically, as illustrated by FIG. 3A, the curve 320 above the camera 300 shows how the input image is distorted (occlusion) when mapped onto the oblique imaging plane 310 relative to the non-planar geometric proxy 325. As illustrated, the portion of the input image between rays 330 projects onto geometry 325 occluded from the selected viewpoint. These occlusions cause the input image to fold over on itself (curve 320) when mapped onto the proxy 325. With folds, pixels from the input image that project onto parts of the proxy 325 occluded from the output viewpoint are missing in the output image.

Similarly, as illustrated by FIG. 3B, the curve 335 above the camera 305 shows how the input image is distorted (hole) when mapped onto the oblique imaging plane 315 relative the non-planar geometric proxy 325. As illustrated, the portion of the output image (curve 335) between rays 340 is occluded from the input image's viewpoint. These types of discontinuities show up holes 345 in the oblique imaging plane 315. In other words, holes are generated when the output viewpoint captures parts of the proxy not visible from the perspective of the input image.

Figure 4A:
FIG. 4A provides an oblique perspective image of a tower sitting on the top of a hill.
Figure 4B:
FIG. 4B is an example of the image of FIG. 4A once that image has been rendered or mapped to a geometric proxy of the hill, wherein the top of the tower projects onto the back of the hill as a "fold" type discontinuity.

An example of a mapping with a fold in it is shown by FIG. 4A and FIG. 4B. In particular, FIG. 4A provides a perspective image of a tower sitting on the top of a hill. FIG. 4B is an example of the image of FIG. 4A once that image has been rendered or mapped to a geometric proxy of the hill, such as a DEM or other ground elevation model. Clearly, there are noticeable artifacts in the rendered image of FIG. 4B. Specifically, the top of the tower projects onto the back of the hill, so, when viewed from a slightly shallower angle than the original image (FIG. 4A), the back of the hill is occluded and the top of the tower is cut off (FIG. 4B).

Consequently, to avoid such problems, the Oblique Image Stitcher smoothes the mapping from the input images to the output images instead of to the proxy. As a result, as described in further detail below, discontinuities such as folds and holes are avoided or reduced along with any severe image distortions associated with such discontinuities so as to provide a photorealistic, or at least perceptually plausible, view of the scene.

Next, the Oblique Image Stitcher evaluates the rendered images to identify optimum seams along which the various images are to be blended. Once the optimum seams are selected, the images are remapped relative to those seams by leaving the mapping unchanged at the seams while interpolating a smooth mapping between the seams.

Finally, the remapped images are then composited to construct the final mosaiced oblique view of the scene. The result is a mosaic image constructed by warping the input images in a photorealistic manner which agrees at seams between images. Various enhancements and variations of this general idea are described below.

2.1 System Overview:

As noted above, the Oblique Image Stitcher described herein provides a system and method for constructing photorealistic mosaic images from a set of partially overlapping oblique views of a scene.

In general, the Oblique Image Stitcher receives a set of partially overlapping oblique images as an input, along with the position and orientation of the camera used to capture those images. A geometric proxy is also provided, either from a preexisting model, or constructed from the images, or other data, as described below. Each input image is then projected onto the proxy and rendered from a desired output viewpoint.

To address the issue of overlap of the input images in the output image, seams are chosen between the input images using a graph-cut optimization. The images are then later joined along these seams to construct the output image. However, in one embodiment, before joining the images along the seams, the mapping of each input image to the output image (i.e., the output mosaic) is smoothly interpolated inside the seams (while holding the seams fixed) and the images are re-warped according to the new mapping. Finally, the images are blended across the seams using gradient-domain blending to create the output mosaic.

As noted above, the Oblique Image Stitcher generally operates by first mapping each input image to corresponding portions of a rough 3D model of the scene. In various embodiments, this rough 3D model is represented using any of a variety of conventional "geometric proxies," such as single planes, digital elevations models (DEMs), digital surface models (DSMs), 3D surfaces automatically reconstructed from stereo images, LiDAR-based 3D models, etc. Further, in various embodiments, refined geometric proxies are constructed from various combinations of the aforementioned 3D models. Finally, various geometric proxies may also be combined. For example, a LiDAR-based 3D model of buildings in a city center can be combined with a DEM representing terrain changes over the same area.

The input images are first mapped to the geometric proxy. It should be noted that mapping 2D images to 3D models is equivalent to texture mapping the images to those models (sometimes referred to as "projective texture mapping"). Texture mapping is well known to those skilled in the art, and will not be described in detail herein.

Further, in one embodiment, for each image, each image pixel is first mapped to a series of image rays approximately corresponding to the focal point of the camera used to capture that image by warping each ray so that they are approximately aligned. This warping corresponds to rendering the proxy using a parallel projection instead of the original perspective projection after projecting the images onto the proxy using projective texture mapping. One advantage of rendering from a parallel projection is that it allows for the creation of an arbitrarily large image that can be panned across, as desired. Note that in this case, the viewing angle of the output mosaic can be chosen to be as close as possible to the rays from the input perspective images to minimize the artifacts due to incorrect geometric proxies Once the images have been texture mapped to the geometric proxy of the scene, the images are then evaluated to identify optimum seams along which the various images are to be blended. In one embodiment, this evaluation involves the use of a modified graph-cut analysis for identifying the seams. In other embodiments, seams are identified manually via a user interface, or by selecting appropriate image rays for minimizing image artifacts in the final mosaiced image of the scene.

When composited, portions of images that project onto parts of the geometric proxy that are accurate will tend to agree from image to image. For example, when using a proxy such as a digital elevation model (DEM), those portions of the image that are at or near ground level will tend to agree from image to image, even when captured from slightly different viewpoints. Examples of portions of images that will tend to agree when using a proxy such as a DEM include objects/features such as streets, piers, water, or any other low lying or relatively flat features. However, as described herein, it should be appreciated that any desired type of 3D proxy may be used.

Consequently, in one embodiment, the aforementioned graph-cut analysis for seam identification is biased to prefer features that agree with the geometric proxy of the scene, rather than allowing seams through buildings, trees, or other objects even in the case where the cost basis of such seams is lower. Consequently, the seams resulting from the biased graph-cut analysis help to provide a more photorealistic (or at least perceptually plausible) mosaic image.

In one embodiment, once the optimum seams have been selected, the images are simply composited using conventional blending techniques to construct the final mosaiced oblique perspective view of the scene. However, in related embodiments, further refinements are made to either or both the geometric proxy or the images.

For example, in one embodiment, once the seams have been identified, the geometric proxy is smoothed or attenuated in image patches near seams (while holding the seams fixed, as described below) so that objectionable image artifacts are not introduced into the final mosaic image. One such example would be the use of a digital elevation map (DEM) representing a steep hill, where mapping an image to DEM would cause portions of the image near the seam to "wrap" or "fold" around the hill, and thus to be hidden from view or otherwise unnaturally distorted (as described above with respect to FIG. 4A and FIG. 4B). In this case, the DEM would be attenuated so as to avoid or minimize the folding of the tower onto the non-visible portion of the hill.

In either case, when smoothing or refining the geometric proxy, the corresponding images are then remapped to the modified geometric proxy, subject to the constraint that the original position of the seams relative to the modified proxy remains unchanged. This constraint, while potentially introducing minor physical distortions with respect to objects in the final mosaic image, will help to ensure photorealism (or at least perceptual plausibility) of the final image by maintaining continuity over the seam boundaries.

Further, mapping images to geometric proxies such as DEMS or other 3D models can sometimes result in occlusion boundaries (or holes) that will cause a loss of photorealism in the final mosaic image, even with the aforementioned smoothing of the geometric proxy. Consequently, in another embodiment, conventional hole-filling techniques are used to "hallucinate" photorealistic data for filling those holes. It should be appreciated that such hole-filling techniques are well known to those skilled in the art and will not be described in detail herein.

Figure 5:
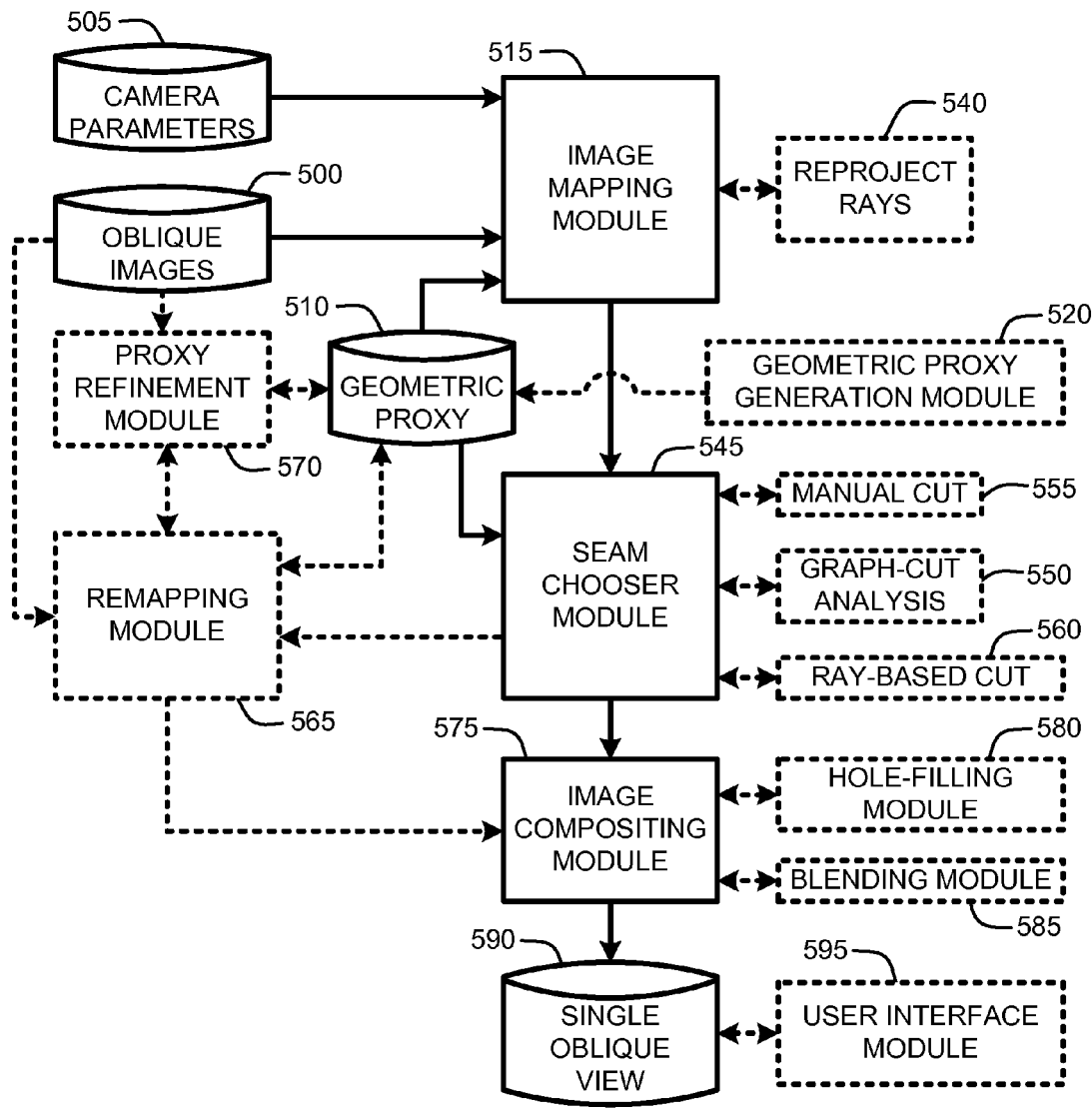
FIG. 5 illustrates an exemplary architectural system diagram showing exemplary program modules for implementing the Oblique Image Stitcher.

2.2 System Architectural Overview:

The processes summarized above are illustrated by the general system diagram of FIG. 5. In particular, the system diagram of FIG. 5 illustrates the interrelationships between program modules for implementing the Oblique Image Stitcher, as described herein. It should be noted that any boxes and interconnections between boxes that are represented by broken or dashed lines in FIG. 5 represent alternate embodiments of the Oblique Image Stitcher described herein, and that any or all of these alternate embodiments, as described below, may be used in combination with other alternate embodiments that are described throughout this document.

In general, as illustrated by FIG. 5, the Oblique Image Stitcher generally begins operation by providing a set of oblique images 500, a set of camera parameters 505, and at least one 3D geometric proxy 510 to an image mapping module 515. In general, the camera parameters 505 represent the positions, orientations and intrinsic parameters of the camera or cameras at the time each image was captured. Once the image mapping module 515 has this data, it proceeds to texture map the various images 500 to the geometric proxy 510, as described in further detail in Section 3.3. In addition, as described in further detail in Section 3.3.1, in one embodiment, the rays of each image 500 are re-projected 540 relative to the camera parameters to make each ray in each image approximately parallel to the ray corresponding to the focal point of the camera. As noted above, this warping or re-projection 540 of rays corresponds to rendering the images to the proxy using a parallel projection instead of the original perspective projection after projecting the images onto the proxy using projective texture mapping.

In one embodiment, a geometric proxy generation module 520 operates to automatically generate a 3D model of the scene using any of a number of conventional techniques. For example, capturing overlapping images of a scene from two or more slightly different perspectives allows conventional stereo imaging techniques to be used to construct stereo depth maps of the scene that can be used as geometric proxies. Such techniques are well known to those skilled in the art, and will not be described in detail herein.

Once the images 500 have been mapped to the geometric proxy, a seam chooser module 545 is then used to identify the optimum seams along which the various images will be composited, as described in further detail in Section 3.4. In a tested embodiment, a biased graph-cut analysis, as described in further detail in Section 3.4, was used to identify seams that provide more photorealistic locations for joining images. As described below, such optimum seam locations tend to areas where the images agree with the proxy. For example, in the case of a DEM or other ground elevation model, such locations or features will tend to include roads, water features (lakes, streams, oceans, etc) and other relatively flat or regular objects that tend to be in good agreement with the geometric proxy. With respect to other proxies, such as detailed building models, or surfaces generated using stereo vision techniques, features such as building edges or walls and the like will tend to agree with the proxy in various locations. Other methods for choosing the seams include manual identification 555 of seams and identification of seams based on selection of image rays 560 relative to the geometric proxy.

In one embodiment, the geometric proxy is refined once the optimum seams have been identified. In particular, as described in further detail in Section 3.5, a remapping module 565 provides the optimum seam information generated by the seam chooser module 545 to a proxy refinement module 570. The proxy refinement module 570 then smoothes or attenuates any large changes or discontinuities in the geometric proxy 510 in the neighborhood of the seams (while holding the seams fixed) so that any artifacts resulting from the subsequent stitching of the corresponding images 500 along those seams will be minimized. Once the geometric proxy has been refined by the proxy refinement module 570, the images 500 are then remapped to the refined model in the same manner as the original mapping. However, in this remapping, the original seams are held fixed.

In either case, the mapped, or remapped, images 500 are then provided to an image compositing module 575 that uses conventional image compositing to blend corresponding images along the previously identified optimum seams. In one embodiment, a blending module 585 uses conventional blending and feathering techniques to make the composited images appear as seamless as possible. Such conventional blending techniques may also include the use of weighted alpha masks. Note that such blending techniques are well known to those skilled in the art, and will not be described in detail herein.

Further, because 2D images are being mapped to a 3D geometric proxy, it is possible that occlusions or holes may exist in the composited image. In this case, a hole-filling module 580 is used to "hallucinate" or image generate data using conventional hole filling techniques in order to hide those holes in a photorealistic manner.

Once the images have been composited by the image compositing module 575, the image compositing module outputs a single mosaic image 590 representing the entire area covered by the original input images 500. In various embodiments, this single view 590 is used for a number of purposes, including, for example, to enable user pans, zooms, and browsing of the area by interacting with the mosaic image via a user interface module 595.

3.0 Operation Overview:

The above-described program modules are employed for implementing the Oblique Image Stitcher described herein. As summarized above, this Oblique Image Stitcher provides a system and method for constructing a photorealistic mosaiced image from a series of partially overlapping oblique views of a scene. The following sections provide a detailed discussion of the operation of the Oblique Image Stitcher, and of exemplary methods for implementing the program modules described in Section 2.

3.1 Operational Details of the Oblique Image Stitcher:

The following paragraphs detail specific operational embodiments of the Oblique Image Stitcher described herein. In particular, the following paragraphs describe the oblique input images; mapping images to a geometric proxy; seam selection; refinement of the geometric proxy and remapping of images relative to the selected seams; image compositing; and hole filling.

3.2 Oblique Images:

As noted above, the Oblique Image Stitcher constructs photorealistic mosaic images from a set of partially overlapping oblique perspective views of a scene. These images may be pre-recorded on a computer readable medium, or provided via any conventional analog or digital camera, via a scanner, or via frames captured from a video stream feed that is capable of being interfaced with an external computing device, and by extension to the Oblique Image Stitcher.

Unlike orthographic views (top-down or nadir, parallel projections, etc.), oblique perspective views provide a compelling 3D impression as building facades are visible. While arbitrarily large areas can be represented in a single parallel-projection image, conventional techniques allow only limited regions to be represented in a perspective image with a reasonable field of view. Further, in contrast to orthographic views which provide a clear sense of context for each portion of the image, navigating through a collection of oblique images can be disorienting (see FIG. 2, for example). The mosaiced oblique views generated by the Oblique Image Stitcher capture the benefits of both orthographic and oblique perspective views since the sides of buildings are visible and arbitrarily large regions can be represented in a single image.

Since the imaging rays are nearly parallel for a long focal length, perspective camera, an oblique perspective view can be approximated by capturing a mesh of overlapping long focal length perspective images from a plane flying several swaths over an area. For a given flight altitude and image size, longer focal lengths result in smaller image footprints on the ground, which requires that the plane fly more swaths. The cost of acquiring images is roughly proportional to the flying time. Consequently, doubling the number of swaths doubles the acquisition cost.

Alternatively, the imagery could be captured with pushbroom type cameras instead of a perspective camera. In a pushbroom camera, the rays along the direction of flight are all parallel, but the imaging rays perpendicular to the direction of flight are perspective. Since a longer focal length still results in a smaller ground footprint, the same tradeoff between focal length and acquisition cost must be made.

3.3 Texture Mapping the Input Images to a Geometric Proxy

As described above, the input images are first mapped to the geometric proxy. In general, once a sufficient number of points of correspondence between an image and the geometric proxy are known, it is a simple matter to map the image to the proxy using conventional texture mapping techniques. However, it should be noted that these correspondence points are not needed if the camera position is known a priori (e.g. from GPS measurements). In this case, once the position of the image relative to the proxy is known, it is simple to project the image onto the proxy (using projective texture mapping). It should be noted that mapping 2D images to 3D models is equivalent to texture mapping the images to those models (sometimes referred to as "projective texture mapping"). Texture mapping is well known to those skilled in the art, and will not be described in detail herein.

As noted above, any of a number of geometric proxies can be used by the Oblique Image Stitcher to generate an oblique perspective view from a set of perspective images. Further, also as noted above, geometric proxies may be constructed from available data using conventional proxy generation techniques such as, for example, stereo images, or the use of LiDAR data to construct the initial geometric proxy.

3.3.1 Re-projection of Image Rays

Figure 6A:
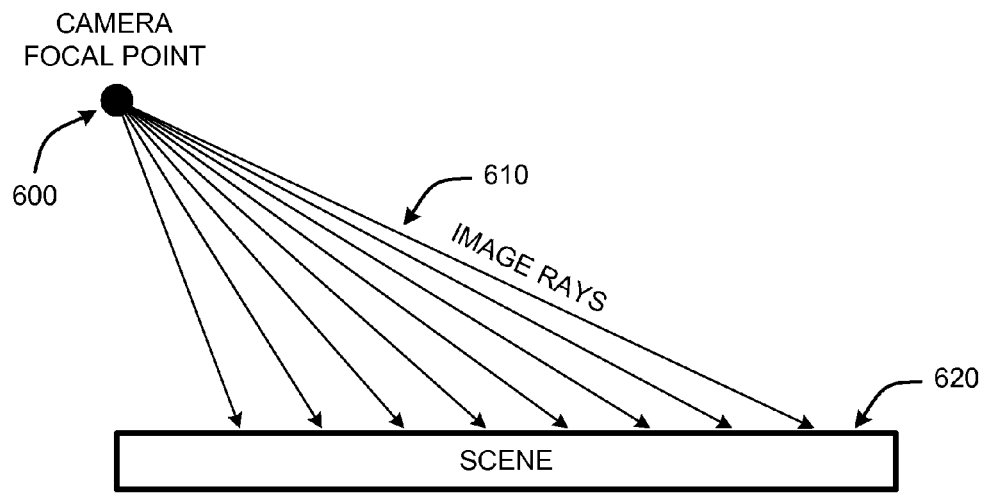
FIG. 6A illustrates image rays from a camera used to capture an oblique perspective view of a scene.
Figure 6B:
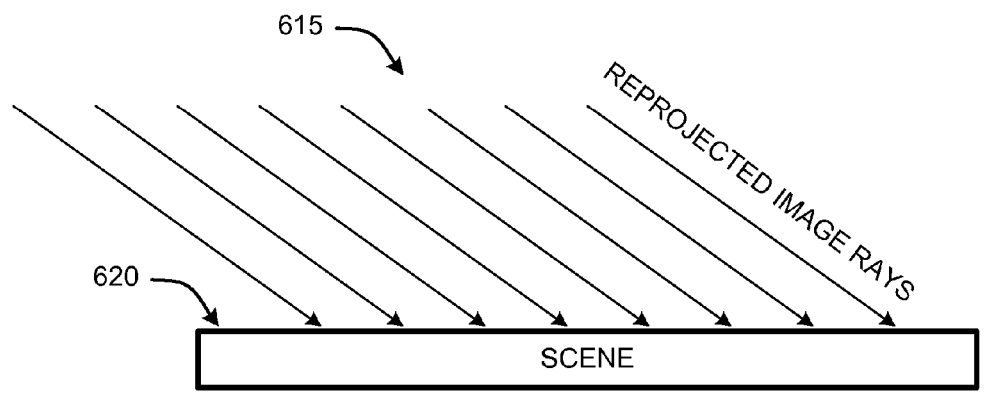
FIG. 6B illustrates the image rays of FIG. 4A following re-projection of those rays so that each of the rays is approximately parallel.

As noted above, in one embodiment, image rays are re-projected so that they are approximately parallel, rather than extending in a fan-like pattern from the focal point of the camera to the extents of the scene captured by the image. See FIGS. 6A and 6B, for example. In particular, as illustrated by FIG. 6A, the image rays 610 corresponding to the pixels of the scene 620 originate from the focal point 600 of the camera. Consequently, these rays 610 view each corresponding point of the oblique image of the scene 620 from slightly different perspectives. Therefore, as illustrated by FIG. 6B the rays 615 are re-projected such that they are approximately parallel to each other, thereby ensuring that each image ray is capturing the corresponding pixel of the image of the scene 620 from the same perspective.

As noted above, the re-projection of image rays is completed prior to texture mapping the images to the geometric proxy. Consequently, this warping or re-projection corresponds to rendering the proxy using a parallel projection instead of the original perspective projection after projecting the images onto the proxy using projective texture mapping. Further, this re-projection of rays tends to produce a more photorealistic image with respect to the final oblique perspective view of the scene, with fewer artifacts near original image boundaries

3.4 Seam Selection:

The problem of choosing seams between images can be restated as labeling each pixel in the output mosaic with a source input image. Therefore, seams correspond to transitions from one input image label to another. Choosing the best seams can be considered as an objective function (overall seam cost, C), wherein minimization of that objective function (to identify the best seams) is determined as a function of the sum of unary and binary costs as illustrated by Equation 1:

$$C = \sum_{x \in X} C(x, L(x)) + \sum_{(x,x') \in N} C(x, x', L(x), L(x')) \quad \text{Equation 1}$$

where X and N are, respectively, the sets of all pixels and all pairs neighboring pixels in the output mosaic. Therefore, the cost of assigning label L(x) to pixel x is C(x, L(x)) and the cost of assigning the labels L(x) and L(x') to neighboring pixels x and x' is C(x, x', L(x), L(x')).

This optimization problem can be transformed into an equivalent graph-cut problem using conventional graph-cut analysis techniques. In general, graph cut based algorithms transfer a cost minimization problem to an equivalent graph cut problem. Consequently, a minimum cut on a graph with two labels can be calculated through a number of existing algorithms like conventional "maximum flow" techniques. For more than two labels, iterative algorithms like conventional "α-expansion" techniques may be used repeatedly to reduce the problem to a two label formulation, thereby guaranteeing convergence to a local minimum within a known factor of the global minimum. Note that such graph-cut techniques are well known to those skilled in the art, and will not be described in detail herein.

It should be noted that there are can be cases with image overlaps where there is no good cut or seam other than an occlusion boundary. In such cases, the Oblique Image Stitcher operates to identify seams by identifying edges and cutting around objects to address such occlusion boundaries. An example of this would be to identify the edges of a building representing an occlusion boundary, and then to cut around a building instead of randomly cutting right through the building in order to obtain the lowest cost seam. It should also be noted that cuts along an occlusion boundary remove seam constraints when smoothing the mapping since the occlusion boundary doesn't need to line up with the other image.

3.4.1 Viewing Angle:

As noted above, the position and orientation from which the input images were taken is known, and is provided to the Oblique Image Stitcher. Consequently, each pixel in the input images is mapped to a ray extending from the center of projection of the camera. Consequently, given the mapping of input images to the output, the ray associated with each pixel in the output mosaic is also known.

For a Lambertian scene where the geometric proxy is an exact model of the scene geometry, the angle between the output mosaic ray and input image ray is inconsequential. However, for non-Lambertian scenes, the color of a pixel varies with the viewing direction. Therefore, any artifacts caused by the view-direction dependence can be minimized by making sure the angle between the rays is small. Similarly, errors in the proxy will cause pixels in the input image to shift on the output mosaic, generating parallax artifacts. Further, the pixel will not shift at all if the rays from the input image and output mosaic are parallel, but the shift will increase as the angle between the rays grows.

To address this issue, a "penalty" value is used when choosing pixels from an input image based on the angle between the ray from the input image and the ray from the output image, with large angles being penalized more than small angles. This concept can be expressed as a unary cost that is a function of the source image ray $r_s(x)$ and mosaic image ray $r_m(x)$, as illustrated by Equation 2:

$$C_v(x,L(x)) = f(r_s(x,L(x)), r_m(x,L(x))) \quad \text{Equation 2}$$

where, $f$ is a function that penalizes large angles between two rays. Clearly, there are many ways to assign such penalties. For example, in one embodiment, penalties are assigned using a function $f$ as illustrated by Equation 3, where:

$$\sin(\theta) = \sqrt{1 - \frac{\langle r_s(x), r_m(x)\rangle^2}{\|r_s(x)\|\|r_m(x)\|}} \quad \text{Equation 3}$$

which roughly corresponds to how much a re-projected point is shifted as a result of an inaccuracy in the geometric proxy, as discussed below. In a related embodiment, the Oblique Image Stitcher roughly approximates the above-described biasing by simply biasing toward the center of each image.

3.4.2 Proxy Accuracy:

It is quite challenging to get a geometric proxy that is accurate enough to generate photorealistic images of real-world scenes when images are texture mapped to the proxy. Both stereo and active illumination approaches, such as light detection and ranging (LiDAR), generate estimates of the surface that can be quite noisy. This is especially true for natural scenes with lots of specularities. However, more photorealistic renderings can often be produced by using a proxy that is much smoother than the true surface.

Unfortunately, after mapping, overlapping images will generally only line up where the geometric proxy is correct. Therefore, it is better to identify seams to cut along portions of the mapped images where the proxy is accurate. One way to bias against cutting where the geometric proxy is inaccurate is to only cut where colors in the source images agree. With this color-matching technique, the color consistency used for identifying seams is expressed as a binary cost $C_c(x, x', L(x), L(x'))$, where:

$$\|I(x,L(x)) - I(x,L(x'))\| + \|I(x',L(x)) - I(x',L(x'))\| \quad \text{Equation 4}$$

where $I(x, L(y))$ is the color of pixel x on the mosaic in the image corresponding to label $L(y)$.

However, in many real-world scenes, the proxy in overlapping images is not guaranteed to be correct just because the pixel colors agree. For example, portions of the scene with uniform color can agree even if the proxy is off significantly. Consequently, in various embodiments, the Oblique Image Stitcher also considers the consistency between the proxy used for texture mapping the input images, and the best estimate available of the true surface. This estimate can come from a number of sources, including stereo and active illumination such as LiDAR. While the best estimate of the surface may not be suitable for generating photorealistic renderings, it can often prevent seams from running through portions of the proxy that are inaccurate.

A simple way to penalize the proxy for not agreeing with the best estimate of the surface is to compare the depths of the two models for both neighboring pixels in the camera space of the mosaic. However, this would fail to penalize locations on the resulting mosaic which are shadowed from the perspective of the input images. For example, if there is a tall building on one side of a street that is not modeled in the geometric proxy, the projection of the building onto the proxy may cross over the street. Even though the proxy and surface agree on the street, choosing a seam that follows the street would cut through the projection of the building.

This problem can be avoided by only choosing seams where the proxy and the estimated surface agree from the viewpoints where both input images were taken. For example, in the "tall building" example provided above, seams on the mosaic are penalized more at the top of the projection from the overlapping input images of the building. Therefore, the penalty is encoded as a binary cost $C_d(x, x', L(x), L(x'))$ which can be expressed as:

$$D(x,L(x)) + D(x,L(x')) + D(x',L(x)) + D(x',L(x')) \quad \text{Equation 5}$$

where $D(x, L(y))$ is the distance between where pixel x in image $L(y)$ re-projects on the mosaic using the proxy and the best estimate of the surface. If the ray from image $L(y)$ is co-linear with the mosaic ray, then this distance will be zero regardless of any inaccuracies in the proxy. Similarly, if the proxy is correct, the angle between the rays does not matter, and the distance is zero as well. For all other cases, this distance increases with the angle between the rays and the distance between the geometric proxy and the best estimate of the surface.

3.4.3 Occlusion Boundaries:

In general, the proxy needs to be accurate at the seams between images. This is because the pixels on either side of the seam correspond to neighboring points on the real 3D surface. When one object occludes another, neighboring pixels that span the occlusion boundary do not correspond to neighboring 3D surface points. The pixel on one side of the boundary corresponds to a point on the occluder, while the pixel on the other side of the boundary corresponds to the occluded object. It is perceptually difficult for a human observer to tell if an occlusion boundary is moved slightly (the occluder is shifted with respect to the occluded scene). Therefore, the Oblique Image Stitcher uses these occlusion boundaries to hide seams.

However, it is generally not appropriate to simply cut along any occlusion boundary. Specifically, for rough proxies, an occlusion boundary in one re-projected input image will not typically line up with occlusion boundaries in the re-projected neighboring image. Therefore, in one embodiment, seams are chosen so that the occluder is kept from the resulting image. With this in mind, the corresponding binary cost can be expressed as:

$$C_o(x, x', L(x), L(x')) = \begin{cases} \sigma & \text{if } O(x, x', L(x)) \text{ or } O(x', x, L(x')) \\ 1 & \text{otherwise} \end{cases} \quad \text{Equation 6}$$

where $O(x, x', L(x))$ is true if and only if pixel x corresponds to the occluder and x' corresponds to the object being occluded in image $L(x)$. Note that the binary cost illustrated by Equation 7 is a positive cost instead of a negative cost. In particular, this cost rewards good seams (with a higher cost or score) instead of just penalizing bad places to cut.

3.4.4 Warp Smoothness:

As noted above, when stitching images together, though, the proxy must be correct at the seams between images so they line up. If the proxy is incorrect, the images will overlap too much or little, resulting in portions of the scene being cut out or appearing twice. Therefore, the Oblique Image Stitcher acts to ensure that portions of the input images on the seam boundaries do not change where they get mapped to after smoothing the mapping. In general, these competing goals are balanced by smoothing the warping from input image to output image inside the seams, while keeping the mapping unchanged at the boundaries between images.

Figure 7:
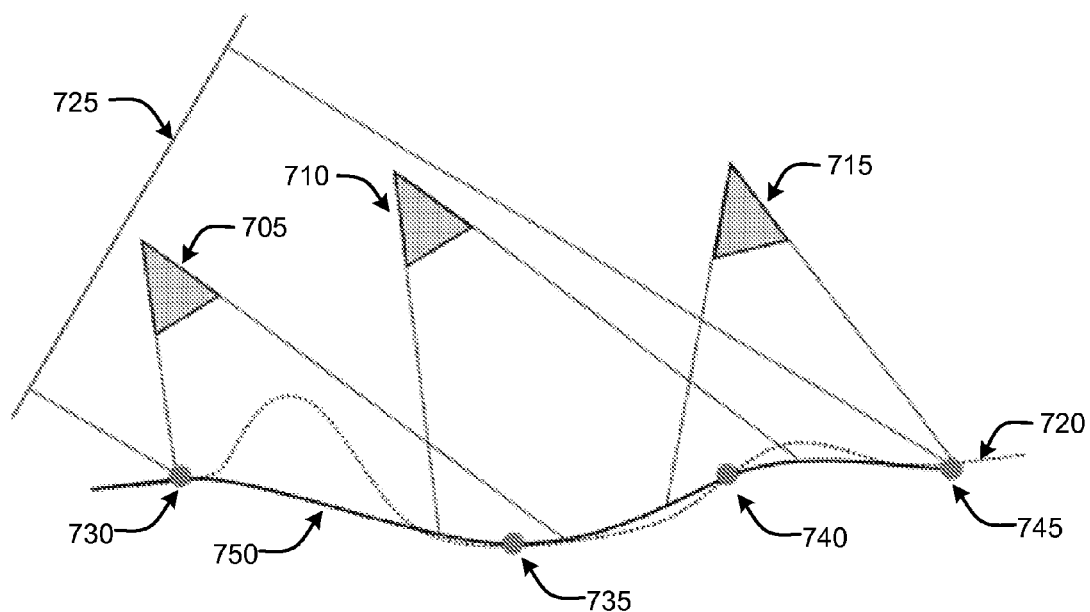
FIG. 7 illustrates attenuation or smoothing of a geometric proxy in areas between seams where overlapping images are to be joined.

This concept is graphically illustrated by FIG. 7. In particular, as illustrated by FIG. 7, a series of partially overlapping images captured by cameras 705, 510, and 715 are mapped to a geometric proxy 720 (shown as a broken line) and rendered to a desired viewing plane 725. Then, once the seam locations (shown as dots 730 through 745) are identified, a smoother geometric proxy 750 is computed while keeping the seam locations (730 through 745) fixed. This process results in mosaics where the stitched images agree at the seams, but are distorted between the seams in a perceptually plausible manner.

As discussed in further detail in Section 3.5, the mapping from the input images to the final mosaic should be as smooth as possible between the seams, given the constraint that the images still need to line up at the seams. Therefore, the Oblique Image Stitcher will not change the warping at the seams, but will operate to smooth it between the seams. The smoother the warping on the seams is, the smoother the overall warping will be after smoothing. Therefore, the Oblique Image Stitcher penalizes choosing seams where the warping function is not smooth.

There are a number of choices for the warping smoothness seam cost $C_w(x, x', L(x), L(x'))$. For example, one approach is to choose only seams where the proxy is smooth. An example of this is to texture the proxy with some function of the curvature (Gaussian or mean curvature) and then render the proxy from the desired viewpoint of the mosaic. However, depending on the viewpoint, reasonably smooth proxies can still generate occlusion boundaries in the final mosaic, thereby causing discontinuities in the warping from input image to mosaic. The Gaussian or mean curvatures of the proxy, or other transformation invariant measures of the proxy smoothness, do not capture the view-dependence of the warping from input image to mosaic.

Consequently, the distortion measure described below is a better indicator of how perceptually plausible the rendered image is from the viewpoint of the mosaic. In particular, in one embodiment, the Oblique Image Stitcher penalizes seams that cut through portions of the mosaic with high first or second order derivatives. Therefore, the warping seam cost $C_w(x, x', L(x), L(x'))$ can be expressed as $$d(x,L(x))+d(x,L(x'))+d(x',L(x))+d(x',L(x')) \quad \text{Equation 7}$$

where $d(x, L(y))$ is the distortion field cost at pixel x on the mosaic when warping image $L(y)$. Note that the cost for first and second order derivatives are given by Equations 16 and 18, respectively, as discussed in further detail below.

3.5 Refinement of the Geometric Proxy Relative to Optimum Seams:

As noted above, in one embodiment, prior to compositing the images following identification of the optimal seams as described in Section 3.4, the geometric proxy is further refined, or smoothed, to increase perceived photorealism in areas between the seams.

In general, smooth mappings from input image to mosaic tend to look more photorealistic to a human observer. Therefore, after choosing the seams between images, the Oblique Image Stitcher interpolates a smooth mapping between the input and output images. The Oblique Image Stitcher first fits a homography to the pixels on the seam between the output and input images. The part of the warping corresponding to the homography is then removed, leaving behind a residual distortion field. The Oblique Image Stitcher then interpolates a smoother distortion field between the seams. To generate the output mosaic, the Oblique Image Stitcher then rewarps the input images using the composed homography warp and smoothed distortion field. Finally, the Oblique Image Stitcher blends the rewarped input images on the mosaic using conventional gradient-domain fusion techniques.

Further, as discussed in further detail in the following Sections, the value of the distortion field at any particular location is only an approximation to the distance of the proxy from the viewing plane. Therefore, smoothing the distortion field is not equivalent to smoothing the height field. One advantage provided by the Oblique Image Stitcher is that the distortion field can be calculated directly from the pixel correspondences between the input image and the final mosaic.

If the geometric proxy is very crude, stereo imaging techniques can be used to improve the proxy where the images overlap. In this case, the disparity values are then turned back into a new proxy and the geometry can then be smoothed explicitly. Further, if the camera positions are not accurate, correspondences between images can still be computed, but the underlying geometry cannot be triangulated reliably. In this case, explicitly smoothing the geometry is not an option, but the process provided by the Oblique Image Stitcher can still be used. This scenario occurs often when capturing panoramic mosaics.

For example, if the camera's center of projection translates slightly from picture to picture, there will be a parallax-induced flow-field added to the homography between images. The geometry resulting from estimating the camera positions and running stereo in this low-overlap small-baseline situation would tend to be very unreliable. However, the disparity map, or flow field, is much more reliable and is sufficient to use with our approach.

There are many conventional approaches for rendering a new view from a sparse set of images and a rough proxy. Typically, such techniques tend to sacrifice overall image quality to allow rendering from any of a number of desired viewpoints, and typically allow that viewpoint to be changed to render new views, or to provide dynamic translation from one view to another by making the rendered view vary smoothly over a spatial neighborhood. However, in contrast to conventional techniques, the Oblique Image Stitcher is only concerned with rendering from a single desired viewing direction. This is an important distinction since it means that the Oblique Image Stitcher is not concerned with making the rendered view vary smoothly over a spatial neighborhood.

Instead, the Oblique Image Stitcher focuses on making the single desired view as perceptually plausible and photorealistic as possible. Towards this end, the Oblique Image Stitcher texture maps the geometric proxy with each input image in turn, and renders the texture mapped proxy from the desired viewpoint. In general, as discussed above, the rendered images will agree in places where the proxy is correct or the images are textureless. However, simply blending the rendered images results in ghosting artifacts where the proxy is incorrect.

As discussed above, such ghosting artifacts are avoided when combining the rendered images into a single composite by choosing seams between the images and only blending across the seams. This results in a graph-cut formulation where seams are biased to occur where the underlying images agree, and is regularized by penalizing the length of the seam. Further, also as discussed above, it is best to choose seams at places where the underlying proxy is correct. For example, if both a DSM and DEM are available, the smoother DEM will generate more photorealistic images when used as a proxy. The DSM can be used to tell where the DEM is inaccurate. If it is known that portions of the smooth proxy are incorrect, the graph-cut can be biased away from these spots by increasing the cut cost there.

In addition to biasing the seams away from places where the proxy is incorrect, in one embodiment, the Oblique Image Stitcher also implements a bias toward choosing pixels that represent rays close to the viewing direction of the output image. In this case, the Oblique Image Stitcher penalizes selection of pixels from a view based on how different their viewing angles are from the viewpoint of the desired oblique view.

As noted above, the process of texture mapping and rendering defines a flow field from the original image to the output image. On an image-by-image basis, the rendered image will look photorealistic, at least locally, in places where the flow field is smooth. However, when viewed from an oblique angle, areas of high curvature in the proxy will generate occlusion boundaries in the image. These occlusion boundaries correspond to discontinuities in the mapping between input and output image and will cause a loss of photorealism. Therefore, as discussed below, once the seam locations are known, the geometric proxy is smoothed out in places where the seams do not cut. Therefore, by choosing seams to avoid wavy portions of the flow field, the waviness can be smoothed out later. Therefore, the Oblique Image Stitcher increases the seam cost where the flow field is not smooth.

3.5.1 Computing the Distortion:

By projecting the original image onto the proxy and rendering from the new viewpoint, the Oblique Image Stitcher is defining a function which maps pixels in the output image, $x=(x,y)$, to pixels in the input image, $x'=(x',y')$. This function can be expressed by Equation 8 as $$x'=f_r(x,P,X) \qquad \text{Equation 8}$$

where X and P represent the proxy mesh and the viewpoint parameters, respectively. This pixel-wise mapping can be turned into a lookup table by saving the texture coordinates of each pixel during the rendering process. Therefore, if the proxy is replaced with a plane, the original image is mapped to the output image by a homography, H. This function can then be written as:

$$x' = f_h(x, H) = \left(\frac{h_1(x^T, 1)^T}{h_3(x^T, 1)^T}, \frac{h_2(x^T, 1)^T}{h_3(x^T, 1)^T}\right) \qquad \text{Equation 9}$$

where $h_i$ is the $i^{th}$ row of H.

The true mapping can be written as the composition of the homography warp and a distortion field, $x_d$, that varies over the image as illustrated by Equation 10:

$$x'_i = f_h(x+x_d, H) \qquad \text{Equation 10}$$

Figure 8:
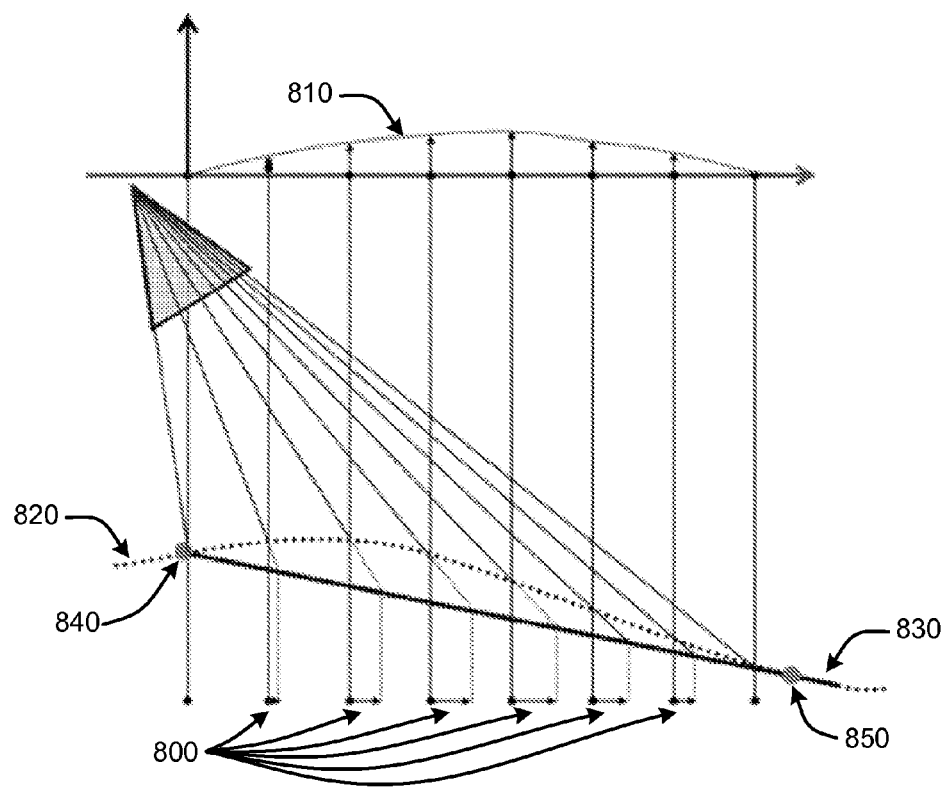
FIG. 8 illustrates an example of smoothing a distortion field for ensuring that a rendered image look more like the original image rendered onto a plane.

The distortion field represents how much the rendered pixel location must be adjusted to match the homography. A one-dimensional example of a distortion field is shown in FIG. 8. In particular, as illustrated by FIG. 8, the distortion field 800 is plotted as a set of black arrows for each pixel on a mosaic rendered from a camera. The dotted line 820 is the geometric proxy and the solid line 830 is the plane that fits the seam boundaries 840 and 850. The distortion field 800 represents where each pixel on the mosaic must move to so that the plane maps them to the same place as the proxy. By smoothing this distortion field, the Oblique Image Stitcher makes the rendered image look more like the original image rendered onto a plane.

To summarize the smoothing approach, the Oblique Image Stitcher first computes the homography $\hat{H}$ that best maps pixels on the seam boundary, B, from the original image to the output image:

$$\hat{H} = \underset{H}{\operatorname{argmin}} \int_{(x,y)\in B} \|f_h(x, H) - f_r(x, P, X)\|^2 \, dx \, dy \qquad \text{Equation 11}$$

Next, the Oblique Image Stitcher computes the distortion field by mapping the saved texture coordinates back through the homography as illustrated by Equations 12 and 13:

$$x_d = f_h^{-1}(x'H) - x \qquad \text{Equation 12}$$

$$= f_h(x', H^{-1}) - x. \qquad \text{Equation 13}$$

Finally, the Oblique Image Stitcher interpolates a smooth distortion field, d(x,y), inside the seams.

3.5.2 Distortion Interpolation:

Note that in the following discussion, the (x,y) terms are dropped from various equations for notational brevity and replaced with the term d.

Interpolating a smooth distortion field is a two-dimensional variational problem, which can be written as the sum of a data and smoothness term:

$$E = w_d E_d + w_s E_s, \quad \text{Equation 14}$$

where $w_d$ and $w_s$ are weights applied to each term. The data term:

$$E_d = \int_{(x,y) \in B} \|d - x_d\|^2 dx dy \quad \text{Equation 15}$$

penalizes changing the distortion field along seam boundaries. The distortion field is prevented from changing on the seam by making the data weight much larger than the smoothness weight.

Two natural regularization choices are first- and second-order smoothness functions. The first order smoothness term can then be expressed using a conventional "membrane model" as illustrated by Equation 16:

$$E_s = \int \|d_x\|^2 + \|d_y\|^2 dx dy \quad \text{Equation 16}$$

The first order term shown above is used to make the surface flat inside the seams, but does not penalize creases on the seams between images.

The second order smoothness function can be expressed using a conventional "thin-plate model" as illustrated by Equation 17:

$$E_s = \int \|d_{xx}\|^2 + 2\|d_{xy}\|^2 + \|d_{yy}\|^2 dx dy \quad \text{Equation 17}$$

The second order term shown above penalizes large curvatures on the surface, which makes the gradient of the distortion field vary smoothly over the seams. This helps eliminate creases that can occur with first order regularization.

When discretized, the first order smoothness term at any point only depends on its neighbors half a pixel away. Since the data term is weighted at the seams, the distortion field does not change there. In particular, the first order regularizing term for pixels inside a seam is independent of what the distortion field is set to outside the seam. Therefore, the first order interpolating surface can be computed independently for each input image.

Further, both pixels on either side of the boundary between input images are counted as part of the seam, so the seam boundary is two pixels wide. Since the second order term only depends on neighbors one pixel away, the second order interpolating surface can also be computed independently for each input image. Note that it is not necessary to break up the computational problem in this manner, as the number of operations performed is not lowered. However, this does allow less memory to be used, as the entire problem is not stored in memory at the same time.

3.6 Image Compositing:

Once the seams have been identified, it is a simple matter to use conventional image compositing techniques to composite the texture mapped images. The general idea is to blend the overlapping images along the seams, without further modifying the images outside of the width of the seams. However, some weighted feathering or blending of areas near the seams may also be performed to ensure a smooth transition from one image to the adjoining image across the seams. Such techniques are well known to those skilled in the art, and will not be described in detail herein.

3.7 Hole Filling:

As noted above, the act of mapping a 2D image to a 3D model can sometimes result in occlusion boundaries (or holes) that will cause a loss of photorealism in the final mosaic image. Consequently, in one embodiment, conventional hole-filling techniques are used to "hallucinate" photorealistic data for filling those holes. In general, such techniques operate by analyzing the textures of the surrounding regions of the image, and then constructing data to fill the hole in a photorealistic manner. It should be noted that while such techniques are capable of creating photorealistic effects in filling such holes, the data used to fill such holes is not real. Consequently, although those portions of the image will look realistic, the data in those portions of the image are synthetic. However, since the number and size of holes is typically relatively small in comparison to the overall image, the use of such hole filling techniques generally enhances the photorealism of the final mosaic image. It should be appreciated that such hole-filling techniques are well known to those skilled in the art and will not be described in detail herein.

4.0 User Interface for Browsing Composite Images:

As noted above, in one embodiment, a user interface is provided for allowing a user to interact with the single oblique perspective view of the scene constructed by the Oblique Image Stitcher. For example, in a simple user interface, the final output image is provided to the user along with a user interface that allows the user to perform operations such as pans, zooms, and browsing of the area covered by the image.

However, it should be noted that the final mosaic image can potentially be very large in size, depending upon the number and resolution of the input images, and whether or not the final mosaic image has been downsampled or otherwise scaled. For example, to capture a sufficient number of high-resolution images across a city such as San Francisco, many thousands of images would be needed. To enable the clearest user experience, especially with respect to zooming, it is desired to maintain as much of the original resolution as possible. As a result, the final mosaic image may be very large in size, potentially requiring a number of Gigabytes of storage, or more.

While such large images are not typically problematic when stored locally, user browsing across a network, such as the Internet, can be very slow when dealing with very large image files.

Consequently, in one embodiment, after the Oblique Image Stitcher has constructed the final mosaic image, the resulting mosaic image is segmented into a plurality of small image files along a predefined grid pattern. Then, when a user wants to view a particular portion of the mosaic image, the corresponding portion of that image is sent to the user via the network. Surrounding areas of the mosaic image may also be sent at the same time to enable the user to quickly pan to surrounding regions. Further, as the user pans in any particular direction, additional portions of the image in the direction of the user panning can also be sent to the user to allow for continued, and uninterrupted, panning.

One advantage of segmenting the overall image into a plurality of sub-images, as described above, is that recombining any two or more of those sub-images for presentation to the user is a simple matter of displaying the images in there relative positions with respect to the predefined grid pattern. No additional computations for blending or compositing those sub-images are required, as the sub-images are already in perfect alignment since they were merely segmented from the final mosaic image, which itself was the subject of the image processing techniques described above.

5.0 Operational Summary:

The program modules described in Section 2 with reference to FIG. 5, and in view of the detailed description provided in Sections 3 and 4, are employed for constructing a photorealistic mosaiced view from a set of input images representing a series of oblique perspective views of a scene. One embodiment of this process is generally depicted in the flow diagram of FIG. 9. It should be noted that the boxes and interconnections between boxes that are represented by broken or dashed lines in FIG. 9 represent alternate embodiments of the Oblique Image Stitcher, and that any or all of these alternate embodiments, as described herein, may be used in various combinations to create additional hybrid embodiments of the Oblique Image Stitcher.

Figure 9:
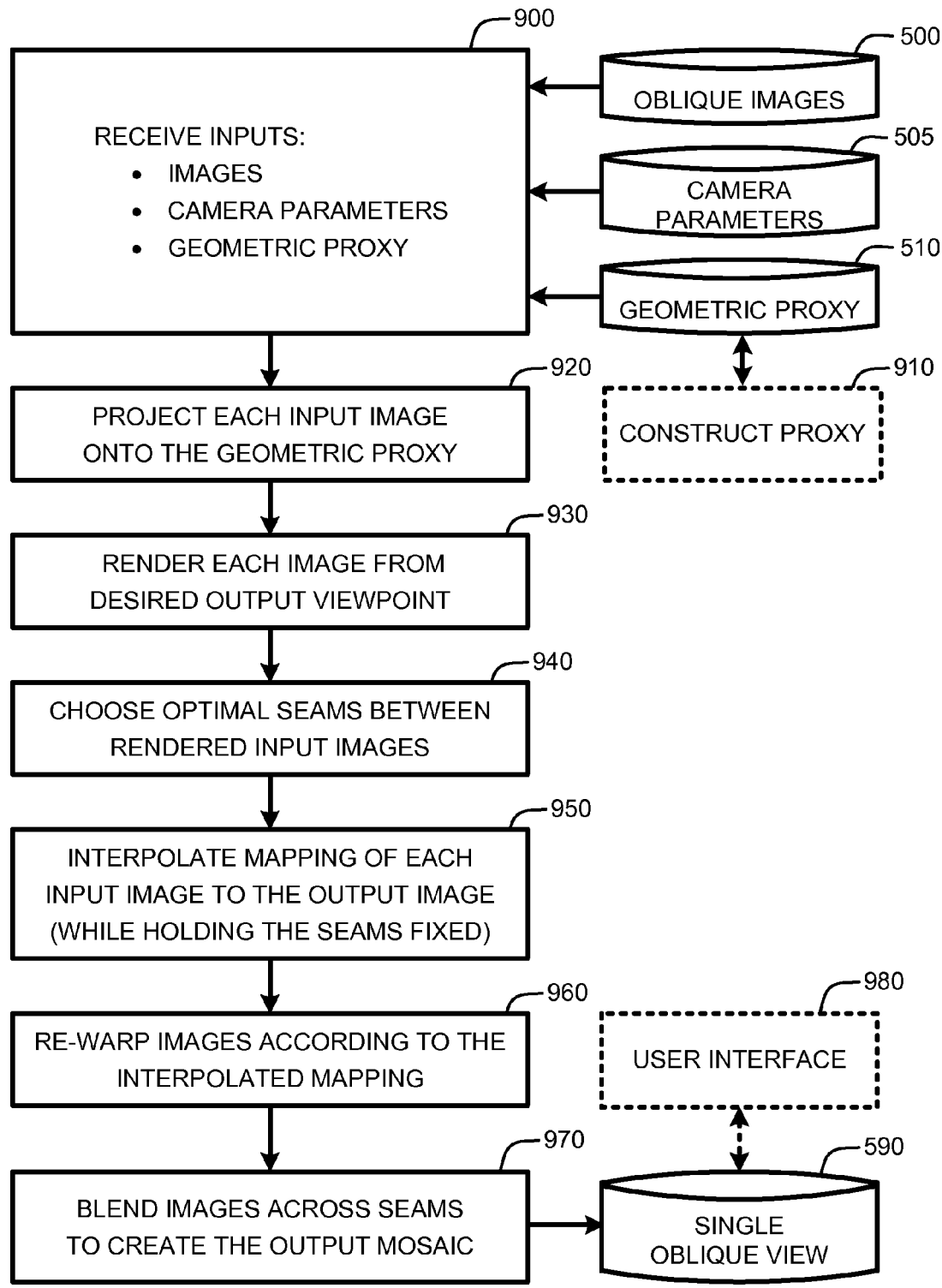
FIG. 9 illustrates an exemplary system flow diagram for a constructing a photorealistic mosaiced view from a set of input images of a scene.

Referring now to FIG. 9, the Oblique Image Stitcher begins operation by receiving 900 a set of partially overlapping oblique images 500 as an input, along with the position and orientation 505 of the camera used to capture those images. A geometric proxy 510 is also provided, either from a preexisting model, or constructed 910 from the images, or other data, as described above. Each input image 500 is then projected 920 onto the geometric proxy 510 using conventional texture mapping techniques, and rendered 930 from a desired output viewpoint.

Optimal seams are then chosen 940 between the rendered input images using a graph-cut optimization, as described above. Once these optimal seams have been chosen 940, the mapping of each input image to the output image (i.e., the output mosaic) is smoothly interpolated 950 inside (between) the seams (while holding the seams fixed) to smooth or attenuate the geometric proxy 510.

The images are then re-warped 960 (again via texture mapping) to the smoothed geometric proxy 510. These re-warped 960 images are then blended 970 across the seams using gradient-domain blending to create the output mosaic 590. Further, as described above, in one embodiment, a user interface 980 is provided to allow local or remote user interaction with the output mosaic 590.

The foregoing description of the Oblique Image Stitcher has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Oblique Image Stitcher. It is intended that the scope of the invention be limited not by this detailed description, but rather by the claims appended hereto.

What is claimed is:

1. A system for constructing a seamless image of a scene from plurality of oblique images of the scene, comprising using a computing device for:
   receiving a set of partially overlapping oblique images of a scene;
   texture mapping each of the images to a geometric proxy of the scene;
   rendering the texture mapped images to a desired viewpoint;
   evaluating the rendered images to identify optimal seams for joining the rendered images; and
   compositing the set of rendered images along the optimal seams to construct a seamless image of the scene.

2. The system of claim 1 further comprising:
   smoothing the geometric proxy in regions adjacent to the optimal seams; and
   remapping the set of oblique input images to the smoothed geometric proxy prior to compositing those images to construct the seamless image of the scene.

3. The system of claim 1 wherein the geometric proxy is automatically constructed from the set of oblique input images.

4. The system of claim 1 wherein evaluating the texture mapped images to identify optimal seams comprises performing a graph-cut analysis to identify a set of lowest cost seams along which to composite the images.

5. The system of claim 4 wherein the graph-cut analysis is biased to prefer seams where the geometric proxy is approximately smooth.

6. The system of claim 4 wherein the graph-cut analysis is biased to prefer seams where images are in best agreement with the geometric proxy.

7. The system of claim 1 wherein further comprising a user interface for interacting with the seamless view of the scene.

8. A computer readable medium having computer executable instructions for automatically constructing a photorealistic mosaiced image from a series of oblique views of a scene, said computer executable instructions comprising:
   mapping a set of oblique images of a scene to a 3D model of the scene;
   performing a graph-cut analysis of the mapped images to identify optimal seams for joining the mapped images;
   attenuating the 3D model of the scene in areas adjacent to the optimal seams while holding areas of the 3D model corresponding to the seams fixed;
   remapping the set of oblique images to the attenuated 3D model of the scene; and
   compositing the remapped images along the optimal seams to construct a photorealistic mosaiced image of the scene.

9. The computer-readable medium of claim 8 further comprising computer executable instructions for automatically constructing the 3D model from the set of oblique images.

10. The computer-readable medium of claim 8 further comprising a user interface for interacting with the photorealistic mosaiced image of the scene.

11. The computer-readable medium of claim 10 wherein the user interface allows a user to interact with the photorealistic mosaiced image of the scene stored on a server computer from a remote client computer across a network.

12. The computer-readable medium of claim 11 wherein the photorealistic mosaiced image of the scene stored on the server computer is segmented into a plurality of sub-images relative to a predefined grid pattern, and wherein particular sub-images are provided to the user interface on the remote client computer on as as-needed basis.

13. The computer-readable medium of claim 8 wherein the graph-cut analysis is biased to prefer seams where the geometric proxy is approximately smooth.

14. The computer-readable medium of claim 8 wherein the graph-cut analysis is biased to prefer seams where images are in best agreement with the 3D model.

15. The computer-readable medium of claim 8 wherein the 3D model is generated from stereo depth information of the scene derived from the set of oblique images of the scene.

16. A method for constructing a photorealistic novel perspective view from a set of input images representing a series of oblique views of a scene, comprising using a computing device to perform steps for:

texture mapping each of the oblique input images to a geometric proxy representing the scene;

performing a graph-cut analysis of the texture mapped images to identify optimal seams for joining overlapping texture mapped images;

smoothing the geometric proxy in regions adjacent to the seams while holding the geometric proxy fixed in areas directly corresponding to the seams;

remapping the oblique input images to the smoothed geometric proxy; and compositing the set of remapped images along the optimal seams to construct a photorealistic novel perspective view of the scene.

17. The method of claim 16 further comprising steps for providing a user interface for interacting with the photorealistic view of the scene across a network, said user interface being provided on a client computer while the photorealistic novel perspective view of the scene is maintained on a server computer and provided to the client computer in response to a request from the client computer via the user interface.

18. The method of claim 17 further comprising steps for segmenting the photorealistic novel perspective view of the scene maintained on the server computer into a plurality of sub-images relative to a predefined grid pattern, and wherein particular sub-images are provided to the user interface on the remote client computer on as as-needed basis to facilitate user browsing of the photorealistic novel perspective view of the scene.

19. The method of claim 16 further comprising steps for generating the geometric proxy from stereo depth information of the scene derived from the set of oblique images of the scene.

20. The method of claim 16 further comprising steps for biasing the graph-cut analysis to prefer seams that will enhance the photorealism of the novel perspective view of the scene.

* * * * *